US008271838B2

(12) United States Patent
Avritzer et al.

(10) Patent No.: US 8,271,838 B2
(45) Date of Patent: Sep. 18, 2012

(54) SYSTEM AND METHOD FOR DETECTING SECURITY INTRUSIONS AND SOFT FAULTS USING PERFORMANCE SIGNATURES

(75) Inventors: Alberto Avritzer, Mountainside, NJ (US); Rajanikanth Tanikella, Princeton, NJ (US)

(73) Assignee: Siemens Corporation, Iselin, NJ (US)

( * ) Notice: Subject to any disclaimer, the term of this patent is extended or adjusted under 35 U.S.C. 154(b) by 252 days.

(21) Appl. No.: 12/778,332

(22) Filed: May 12, 2010

(65) Prior Publication Data
US 2010/0241905 A1 Sep. 23, 2010

Related U.S. Application Data

(63) Continuation-in-part of application No. 11/225,989, filed on Sep. 14, 2005, now Pat. No. 8,055,952.

(60) Provisional application No. 61/178,105, filed on May 14, 2009, provisional application No. 61/222,249, filed on Jul. 1, 2009, provisional application No. 60/628,285, filed on Nov. 16, 2004.

(51) Int. Cl.
*G06F 11/00* (2006.01)
(52) U.S. Cl. ............ 714/48; 714/33; 714/37; 714/38.1; 714/47.1; 726/22; 726/23
(58) Field of Classification Search .............. 714/25, 714/32, 33, 37, 38.1, 39, 40, 45, 47.1, 47.2, 714/47.3, 48; 726/22, 23
See application file for complete search history.

(56) References Cited

U.S. PATENT DOCUMENTS

| | | | |
|---|---|---|---|
| 7,475,292 B2 | 1/2009 | Avritzer et al. | |
| 7,484,128 B2 | 1/2009 | Bondi et al. | |
| 7,502,971 B2 * | 3/2009 | Cohen et al. | 714/45 |
| 7,657,793 B2 | 2/2010 | Avritzer | |
| 2006/0130044 A1 | 6/2006 | Avritzer et al. | |
| 2008/0126881 A1* | 5/2008 | Bruckhaus | 714/47 |
| 2008/0320123 A1* | 12/2008 | Houlihan et al. | 709/224 |

* cited by examiner

*Primary Examiner* — Joseph D Manoskey

(57) ABSTRACT

A method for detecting security intrusions and soft faults in a software system includes receiving a multi-dimensional performance signature built from operating system metrics sampled by a software system monitoring infrastructure, associating a plurality of buckets with each component of the performance signature, comparing a component of the sampled performance signature to an expected value for the performance signature component, where a bucket for the performance signature component is incremented if the sampled performance signature component exceeds the corresponding expected value, and the bucket for the performance signature component is decremented if the sampled performance signature component is less than the corresponding expected value, executing a security alert notification when the bucket for the performance signature component exceeds a first threshold, and executing a soft-fault notification when the bucket for the performance signature component exceeds a second threshold, where the first threshold is less than the second threshold.

22 Claims, 3 Drawing Sheets

SYSTEM AND METHOD FOR DETECTING SECURITY INTRUSIONS AND SOFT FAULTS USING PERFORMANCE SIGNATURES

CROSS REFERENCE TO RELATED UNITED STATES APPLICATIONS

This application claims priority from "Monitoring for Security Intrusion using Performance Signatures", U.S. Provisional Application No. 61/178,105 of Avritzer, et al., filed May 14, 2009; Distinguishing Between Soft Faults and Security Intrusion Using Performance Signatures", U.S. Provisional Application No. 61/222,249 of Avritzer, et al., filed Jul. 1, 2009, the contents of both of which are herein incorporated by reference in their entirety, and is a continuation-in-part (CIP) of U.S. application Ser. No. 11/225,989 of Avritzer, et al., filed on Sep. 14, 2005 now U.S. Pat. No. 8,055,952, which in turn claims priority from U.S. Provisional Application Ser. No. 60/628,285 of Avritzer, et al., filed on Nov. 16, 2004, the contents of both of which are herein incorporated by reference in their entireties

TECHNICAL FIELD

This disclosure is directed to methods for detecting security intrusions and soft faults in software systems using performance signatures.

DISCUSSION OF THE RELATED ART

Large industrial software systems require extensive monitoring and management to deliver expected performance and reliability. Some specific types of software failures, called soft failures, have been shown to leave the system in a degraded mode, where the system is still operational, but the available system capacity has been greatly reduced. Examples of soft bugs have been documented in several software studies. Soft failures can be caused by the evolution of the state of one or more software data structures during (possibly) prolonged execution. This evolution is called software aging. Software aging has been observed in widely used software. One approach for system capacity restoration for telecommunications systems takes advantage of the cyclical nature of telecommunications traffic. Telecommunications operating companies understand the traffic patterns in their networks well, and therefore can plan to restore their smoothly degrading systems to full capacity in the same way they plan their other maintenance activities. Soft bugs typically occur as a result of problems with synchronization mechanisms, such as semaphores, kernel structures, such as file table allocations, database management systems, such as database lock deadlocks, and other resource allocation mechanisms that are essential to the proper operation of large multi-layer distributed systems. Since some of these resources are designed with self-healing mechanisms, such as timeouts, some systems may recover from soft bugs after a period of time. For example, when the soft bug for a specific Java based e-commerce system was revealed, users were complaining of very slow response time for periods exceeding one hour, after which the problem would clear by itself.

One theoretical study to determine the optimal time to perform software rejuvenation for aging software with soft failures based on Markov decision models found optimal software rejuvenation times that would minimize the required cost function. The authors developed a Markov decision process model that allows for two queuing policies. In the first policy software rejuvenation is invoked whenever a buffer overflow is detected. In the second policy, packet loss is allowed without triggering software rejuvenation. A related study uses Markov regenerative stochastic Petri Nets to derive a quantitative analysis of software rejuvenation. The model solution supports the selection of the optimal rejuvenation interval to minimize the expected system downtime. Another study evaluated the use of both check pointing and rejuvenation to minimize software completion times was evaluated. Another methodology for the quantitative analysis of software rejuvenation policies is based on the assumption that system degradation can be quantified by monitoring a metric that is co-related with system degradation. A maximum degradation threshold level is defined and two rejuvenation policies based on the defined threshold are presented. The first policy is risk based. It defines a confidence level on the metric, and performs rejuvenation, with a probability that is proportional to the confidence level. The second policy is deterministic and performs rejuvenation as soon as the threshold level is reached. The theory of renewal processes with rewards is used to estimate the expected system down time and to help estimate the proper rejuvenation intervals. Another methodology for proactive software rejuvenation is based on the statistical estimation of resource exhaustion.

Security intrusion of software can also leave the software in a state where it is still operational but the system available capacity is reduced. Security monitoring software usually relies on knowledge about the behavior of the software perpetrating the security intrusion. As new forms of attacks are created, updates to the security defenses are quickly deployed to thwart these types of attacks.

SUMMARY OF THE INVENTION

Exemplary embodiments of the invention as described herein generally include methods and systems for monitoring for security intrusion using performance signatures that can monitor for deviations from expected known application behavior. A software performance monitoring approach according to an embodiment of the invention tracks the software performance signature and differentiates between well-behaved software signature and degraded mode software signature. An approach according to an embodiment of the invention uses multiple buckets to distinguish between short lived deviations of expected software performance and significant system degradation that is indicative of a security intrusion or a software degradation as a consequence of a software fault. Once the software performance degradation is detected the obtained performance signature is analyzed and categorized into one of two types: security intrusion or software fault. An approach according to an embodiment of the invention relies on knowledge about the well-behaved performance signature of the software/system under attack, and detects soft faults and security intrusions by identifying defective performance signatures and well-behaved performance signatures. Defective performance signatures are associated with soft-faults and security attacks.

According to an aspect of the invention, there is provided a computer-implemented method for detecting security intrusions and soft faults in a software system, the method including receiving a performance signature sampled by a software system monitoring infrastructure, associating a plurality of buckets with each component of the performance signature, comparing a component of the sampled performance signature to an expected value for the performance signature component, where a bucket for the performance signature component is incremented if the sampled performance signature component exceeds the corresponding expected value, and the bucket for the performance signature component is decremented if the sampled performance signature component is less than the corresponding expected value, increasing a number of standard deviations from a mean value for the performance signature component if the bucket for the performance signature component overflows, reinitializing the current bucket to zero, if the bucket for the performance signature component is emptied, and executing a soft-fault or security categorization routine when the bucket for the performance signature component exceeds a threshold.

According to a further aspect of the invention, the threshold comprises a first threshold and a second threshold, where the first threshold is less than the second threshold, where if the bucket for the performance signature component exceeds the first threshold, a security alert notification is executed, and is the bucket for the performance signature component exceeds the second threshold, a soft-fault notification is executed.

According to a further aspect of the invention, the method includes initializing the current bucket for the current component and the bucket index for the current component to zero, and initializing a maximum value of the current bucket for the current component to a predetermined maximum.

According to a further aspect of the invention, the method includes computing a depth of a next bucket for the current performance signature component, and reinitializing the current bucket to zero, when the bucket for the current performance signature component overflows.

According to a further aspect of the invention, the depth of the next bucket for the current performance signature component is computed as $$D[N[i]+1, i] = \frac{D_{MAX}[i]}{S_N[i] - (\bar{x}[i] + N[i] \times \sigma[i])}.$$

According to a further aspect of the invention, the depth of the next bucket for the current performance signature component is computed as $F_{[N,i]}(D_{MAX}[i])$, a function of the current bucket and the current component.

According to a further aspect of the invention, the method includes decreasing a number of standard deviations from a mean value for the performance signature component and reinitializing the current bucket and the maximum value of the current bucket for the current component to a predetermined maximum, when the bucket for the performance signature component is emptied and a value of the current bucket index is greater than zero.

According to a further aspect of the invention, the performance signature is a multi-dimensional vector built from operating system metrics associated with the software system infrastructure.

According to another aspect of the invention, there is provided a computer-implemented method for detecting security intrusions and soft faults in a software system, the method including receiving a performance signature sampled by a software system monitoring infrastructure, the performance signature being a multi-dimensional vector built from operating system metrics associated with the software system infrastructure, associating a plurality of buckets with each component of the performance signature, comparing a component of the sampled performance signature to an expected value for the performance signature component, where a bucket for the performance signature component is incremented if the sampled performance signature component exceeds the corresponding expected value, and the bucket for the performance signature component is decremented if the sampled performance signature component is less than the corresponding expected value, executing a security alert notification when the bucket for the performance signature component exceeds a first threshold, and executing a soft-fault notification when the bucket for the performance signature component exceeds a second threshold, where the first threshold is less than the second threshold.

According to a further aspect of the invention, if the bucket for the current performance signature component overflows, the method includes increasing a number of standard deviations from a mean value for the performance signature component, computing a depth of a next bucket for the current performance signature component based on the amount by which the sampled performance signature component exceeds the corresponding expected value, and reinitializing the current bucket to zero.

According to a further aspect of the invention, if the bucket for the current performance signature component empties, and the bucket index for the current component is zero, the method includes reinitializing the current bucket to zero.

According to a further aspect of the invention, if the bucket for the current performance signature component empties, and the bucket index for the current component is greater than zero, the method includes decreasing a number of standard deviations from a mean value for the performance signature component, and reinitializing the current bucket and the maximum value of the current bucket for the current component to a predetermined maximum.

According to another aspect of the invention, there is provided a program storage device readable by a computer, tangibly embodying a program of instructions executable by the computer to perform the method steps for detecting security intrusions and soft faults in a software system.

DETAILED DESCRIPTION OF EXEMPLARY EMBODIMENTS

Figure 1:
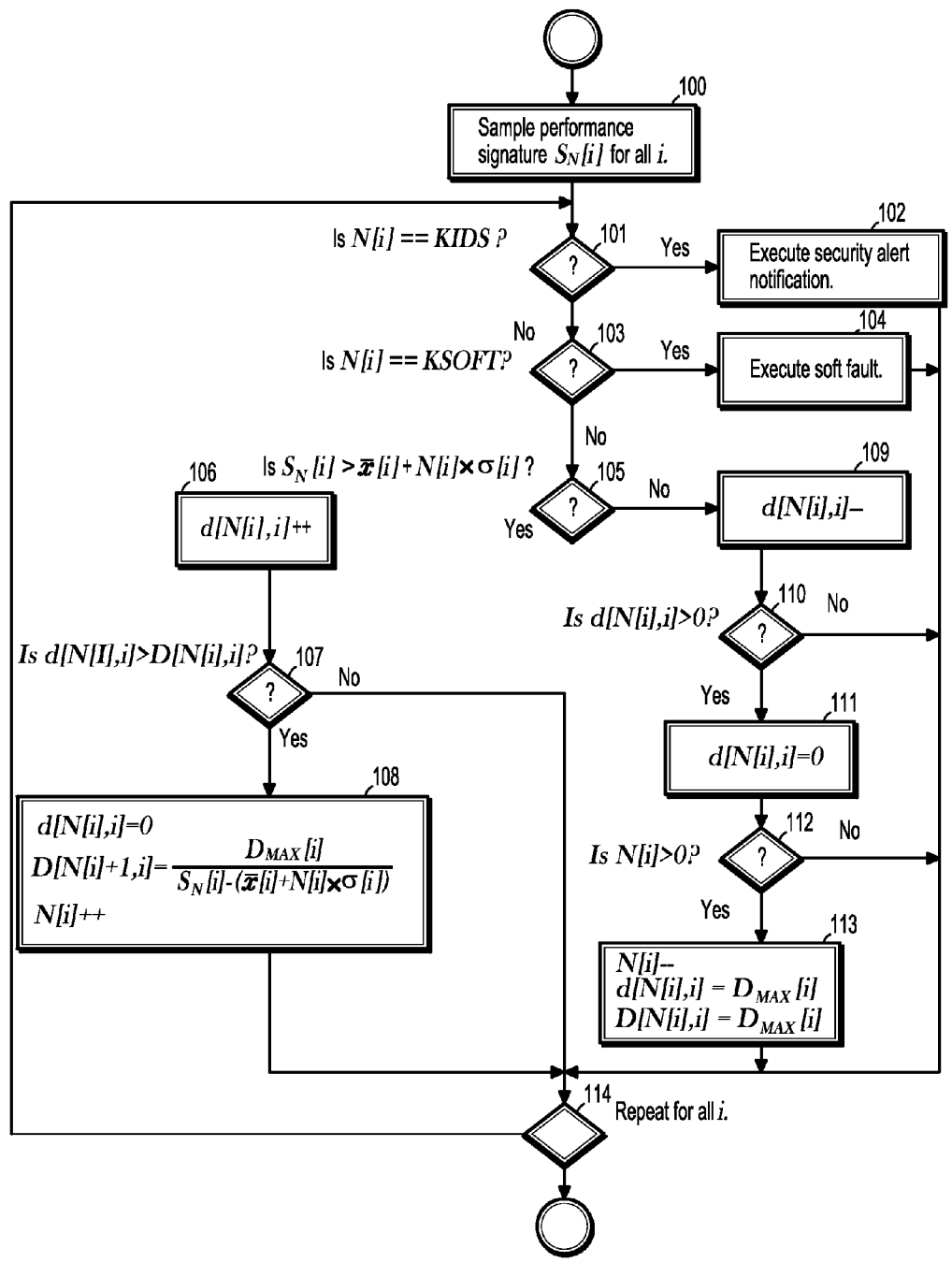
FIG. 1 is a flowchart of a method for estimating a current value of a monitored performance signature, according to an embodiment of the invention.

Exemplary embodiments of the invention as described herein generally include systems and methods for detecting security intrusions and soft faults in software systems using performance signatures. Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

An algorithm according to an embodiment of the invention can distinguish between a well-behaved software signature and a degraded mode software signature, and can distinguish between performance degradation due to soft-faults and performance degradation due to security intrusion. An algorithm according to an embodiment of the invention is based on the premise that the performance signatures can be sampled frequently and that the first and second moments of the metric when the system is operating at full capacity can be estimated before the monitoring tool is deployed in production. An exemplary, non-limiting performance signature may monitor one or more of: the percentage of CPU utilization; the number of active threads; memory swap percentage; working set size; percentage of memory utilization; the number of TCP resets; and the transmitted number of bytes per second. If a bucket for monitoring a component of the performance signature overflows, an algorithm according to an embodiment of the invention signals a detection of a soft-fault or a security intrusion, and triggers a software rejuvenation event. A software rejuvenation event is a pre-emptive restart of a running application or system to prevent future failures. The restart may terminate all threads in execution and release all resources associated with the threads. The software rejuvenation event may include additional activities, such as a backup routine or garbage collection.

The monitoring infrastructure for a software system, for example, the Windows Management Instrumentation API, can periodically capture the performance signature. Exemplary, non-limiting periods are typically in the range of about 5 to about 10 seconds. The performance signature is multi-dimensional and is associated with the underlying infrastructure of the operating system. For example in Unix/Linux, one would use metrics reported by Linux, while in Windows one would use metrics reported by the Windows WMI interface. At each sampling period, the value of each component i of the performance signature $S_N$ can be estimated by counting the recent number of occurrences d of sample values that are greater than $\bar{x}[i]+N[i]\sigma[i]$, where $\bar{x}[i]$ is the reference average expected value of the component i, where N[i] (i=0, 1, 2, ..., I) is the index to the current bucket of component [i], I is the dimension of the performance signature vector, $\sigma[i]$ is the reference expected standard deviation of the performance signature component I, D[N[i],i] represents the depth of bucket N[i], and $D_{MAX}[i]$ is the maximum depth configured for the first bucket of each component. A soft-fault or a security intrusion can be detected by the KSOFT and KIDS thresholds. KSOFT represents the total number of buckets required for a single component i of algorithm for soft-fault detection. KIDS represents the total number of buckets required for a single component i of algorithm for intrusion detection. It has been observed that a security intrusion does not exhaust all buckets but instead causes the system to operate in a degraded mode. For this reason, the KIDS threshold is introduced. According to an embodiment of the invention, KSOFT>KIDS. If it cannot be determined whether a soft-fault or a security intrusion has occurred, then if the event impacts several variables, it is assumed that the event is a security attack. If any of the last available buckets i overflow, an algorithm according to an embodiment of the invention signals a detection of a soft-fault or a security intrusion, and triggers a software rejuvenation event. An algorithm according to an embodiment of the invention tracks the levels of K buckets for each component i. Therefore, K×I buckets are monitored. At any given time, the level d[N[i], i] of only the Nth bucket of each component i is considered. N[i] is incremented when the current bucket overflows, that is, when d[N[i], i] exceeds D[N[i], i], and is decremented when the current bucket is emptied, that is, when d[N[i], i] takes the value zero. Whenever the Nth bucket of component i overflows, the depth D[N[i]+1, i] of the next bucket will be computed as $D[N[i]+1, i] = \frac{D_{MAX}[i]}{S_N[i] - (\bar{x}[i] + N[i] \times \sigma[i])}$.

Figure 2:
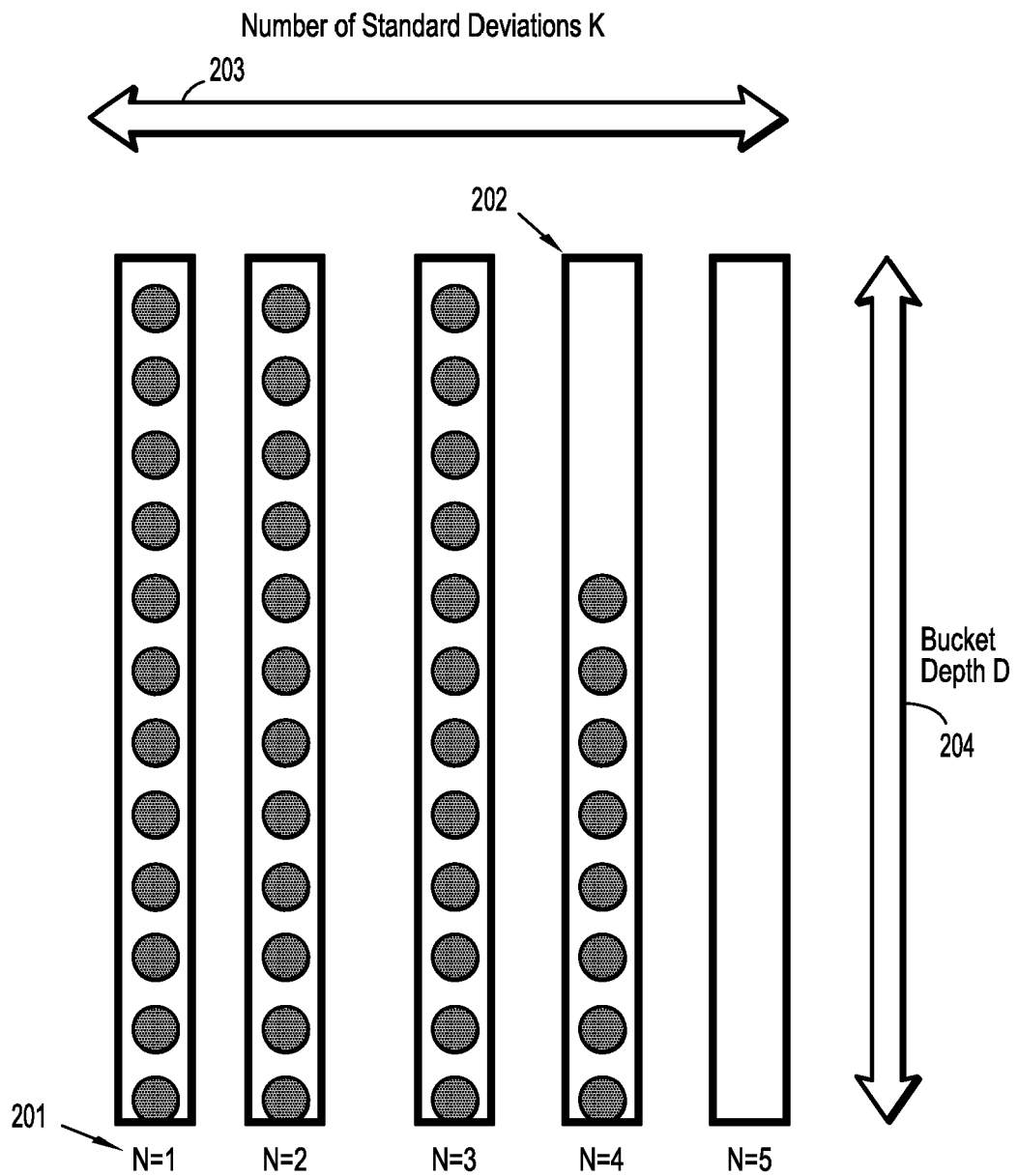
FIG. 2 depicts an exemplary set of buckets, according to an embodiment of the invention.

FIG. 1 is a flowchart of a method for estimating a current value of a monitored is performance signature, according to an embodiment of the invention. The method illustrated by the flowchart is performed periodically for each signature component i of an I dimensional signature component vector. In various exemplary, non-limiting embodiments, the method is executed about every 5 to 10 seconds. In the flowchart, N[i] is the current bucket for component K is the number of buckets, d[N[i], i] is the current depth of the $N^{th}$ bucket for the $i^{th}$ component, $D_{MAX}[i]$ is the maximum depth of a bucket for component i, and D[N[i], i] is the maximum depth of the $N^{th}$ bucket for component i. Initialization is performed at system startup and at rejuvenation with d[0, i]=0, N[i]=0, and D[0, i]=$D_{MAX}[i]$. FIG. 2 depicts an exemplary set of buckets, according to an embodiment of the invention. Referring to FIG. 2, N represents a bucket index 201 and d represents the number of balls stored in a current bucket 202. In the example shown in FIG. 2, N=4, and there are 8 balls in bucket 4. The K buckets 203 are modeled, tracking the number of balls in each bucket.

Referring now to FIG. 1, a method according to an embodiment of the invention begins at step 100 by sampling the performance signature $S_N$ for all i. Step 101 is the beginning of a loop over all i=1, ..., I components of the signature vector. If, at step 101, the value of a bucket N[i] for the current value of i is equal to KIDS, then a security alert notification is executed at step 102, after which rejuvenation is triggered, and the method moves on to the next i at step 114. If, at step 103, the value of a bucket N[i] for the current value of i is equal to KSOFT, then a soft-fault routine is executed at step 104, after which rejuvenation is triggered, and the method moves on to the next i at step 114.

If the value of a bucket N[i] is less than both KIDS and KSOFT, the sampled value for the $i^{th}$ component of the performance signature, $S_N[i]$, is compared at step 105 to expected value for the $i^{th}$ component, $\bar{x}[i]+N[i]\times\sigma[i]$. If $S_N[i]$ is greater than the expected value, the current bucket for the current component, d[N[i], i], is incremented at step 106, otherwise it is decremented at step 109. After step 106, the bucket d[N[i], i] for the current component is compared at step 107 with D[N[i], i] the maximum depth of the $N^{th}$ bucket for component i. If bucket d[N[i], i] exceeds D[N[i], i], i.e., if bucket d[N[i], i] overflows, then at step 108, d[N[i], i] is reset to 0, the depth of the next bucket (N+1)[i] for the $i^{th}$ component is dynamically computed as $$D[N[i]+1, i] = \frac{D_{MAX}[i]}{S_N[i] - (\bar{x}[i] + N[i] \times \sigma[i])},$$

which is equivalent to moving to the next bucket, and the estimation of the expected value of the $i^{th}$ component is incremented by adding one standard deviation to the expected value of the metric by incrementing the component bucket index N[i].

On the other hand, after step 109, the bucket d[N[i], i] for the current component is compared to 0 at step 110. If bucket d[N[i], i] is less than 0, i.e., if bucket d[N[i], i] underflows, then, at step 111, the bucket d[N[i], i] is reset to 0. If, at step 112, N[i] is greater than 0, then at step 113, the current bucket d[N[i], i] is set to $D_{MAX}[i]$, the maximum depth of the bucket for component i, the bucket index N[i] is decremented, and the maximum depth D[N[i], i] of the $N^{th}$ bucket for component i is reset to $D_{MAX}[i]$, the maximum depth of the bucket for component i. The method of FIG. 1 repeats for the next value of i from step 114. Equivalent pseudo-code for the method shown in FIG. 1 is as follows.

```
for (i=0,i < I, i++)
    if N[i] == KIDS then
        issue a security intrusion detection notification
        break
    end
    if N[i] == KSOFT then
        issue a soft-fault notification
        break
    end
    if S_N[i] > x̄[i]+N[i]σ[i] then
        d[N[i], i]++;
    else
        d[N[i], i]--;
    end
    if d[N[i], i] > D[N[i], i] then
        d[N, i]=0;
        D[N[i]+1, i] = D_MAX[i] /(S_N[i] - (x̄[i]+N[i]σ[i])) ;
        N[i]++;
    end
    if (d[N[i], i] < 0) AND (N[i]>0) then
        N[i]--;
        d[N[i], i] = D_MAX[i] ;
        D[N[i], i] = D_MAX[i]; ;
    end
    if (d[N[i], i]<0) AND (N[i] == 0) then
        d[N[i], i] := 0;
    end
end
```

An algorithm according to an embodiment of the invention, such as that illustrated in FIG. 1, can react quickly to significant performance degradation by dynamically computing the value of $D[N[i], i]$. The resilience of an algorithm according to an embodiment of the invention to degradation in the performance signature can be adjusted by tuning the value of $K[i]$, where $K[i]$ represents the number of standard deviations from the mean that would be tolerated for the $i^{th}$ component before a security intrusion or a soft-fault is declared.

In another embodiment of the invention, a performance signature that decreases non-linearly with $D_{MAX}[i]$ can be modeled by using a generic function $F_{[N, i]}(D_{MAX}[i])$ to estimate $D[N[i]+1, i]$ as the system degrades and making the bucket depth relationship to $D_{MAX}[i]$ a function of the bucket index and the component index. Then, $D[N[i]+1, i]$ would be computed as $F_{[N,i]}(D_{MAX}[i])$ in step 108, above.

By dynamically monitoring the software system performance signatures, one can differentiate between well-behaved performance signatures and defective performance signatures. Defective performance signatures can be categorized into performance signatures that are associated with soft faults and performance signatures that are associated with security intrusions. By using dynamically tuned bucket depths, one can quickly detect defective performance signatures. The use of multiple buckets with dynamically tuned depths to county the variability in the measured performance signatures can distinguish between degradation that is a function of a transient increase in user demand versus and degradation that is a function of soft fault or a security intrusion.

In addition, a dynamic tuning for soft-fault and security intrusion detection algorithm according to an embodiment of the invention can deliver good baseline performance at low loads because it is only activated when the performance signature metric exceeds a target. This performance is achieved by using multiple contiguous buckets to track bursts in the arrival process and a variable depth bucket to validate the moments where the estimate of the performance metric should be changed. A dynamic tuning algorithm according to an embodiment of the invention performs at high loads because it quickly adjusts the current bucket depth when it detects significant degradation in the performance signature.

An algorithm according to an embodiment of the invention can be used to monitor the relevant performance signatures in various products and to trigger soft faults and security intrusion declarations, when the estimate of the performance signature for any of its components exceeds a specified target. The dynamic tuning can be used to complement overload control algorithms to protect against denial of service attacks, because the dynamic tuning can react very quickly to slowdowns of the departure process.

It should be noted that throughout the specification, embodiments have been described using the terms "bucket" and "ball". These terms are analogous to any method for counting the occurrence of an event. For example, in computer science, one can consider an element of an array as a bucket, wherein the array has K elements (e.g., buckets) and each element stores a number representing a number of times an event has occurred (e.g., balls). One of ordinary skill in the art would appreciate that other methods of tracking a performance metric are possible.

System Implementations

It is to be understood that embodiments of the present invention can be implemented in various forms of hardware, software, firmware, special purpose processes, or a combination thereof. In one embodiment, the present invention can be implemented in software as an application program tangible embodied on a computer readable program storage device. The application program can be uploaded to, and executed by, a machine comprising any suitable architecture.

Figure 3:
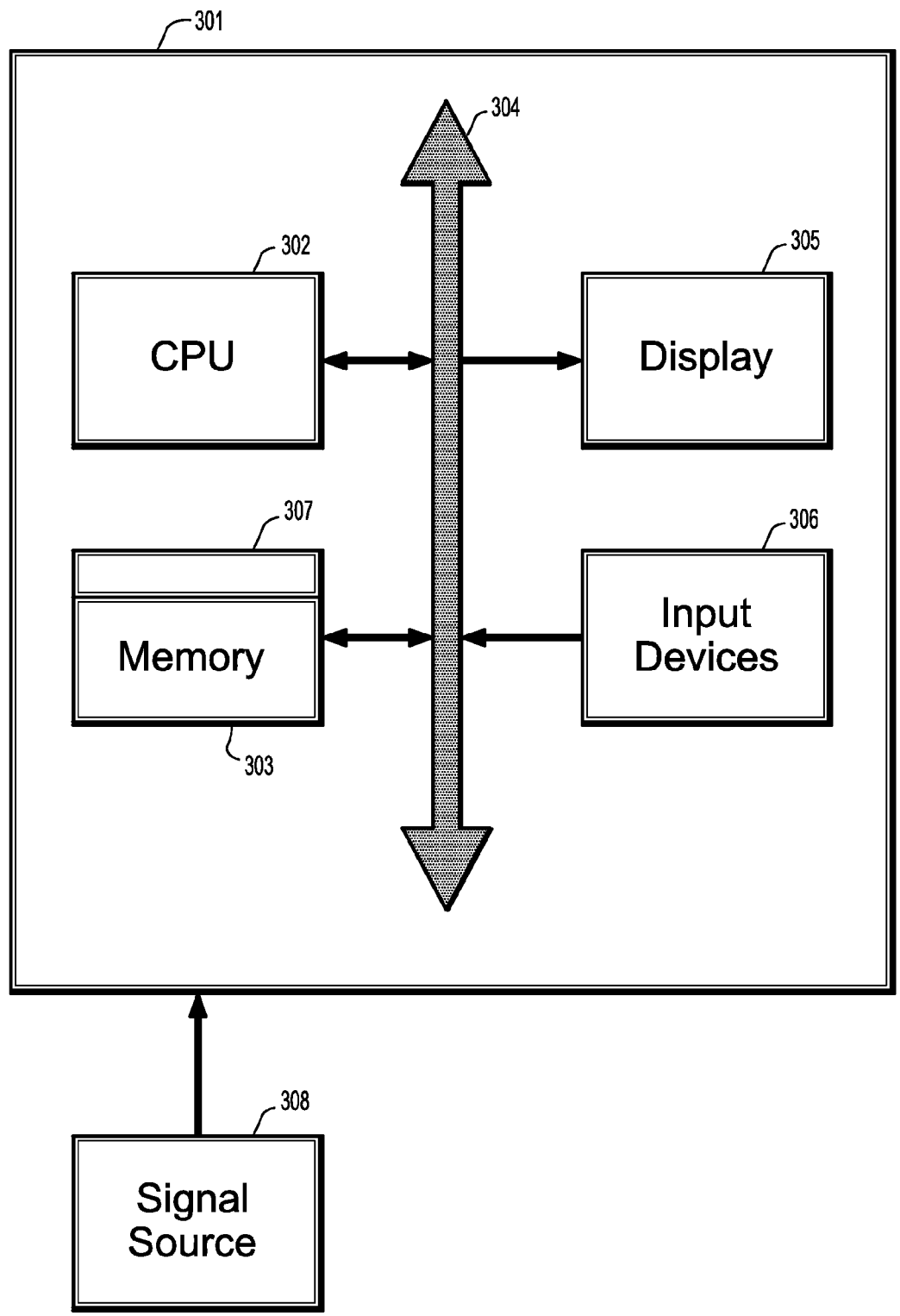
FIG. 3 is a block diagram of an exemplary computer system for implementing a method for detecting security intrusions and soft faults in software systems using performance signatures, according to an embodiment of the invention.

FIG. 3 is a block diagram of an exemplary computer system for implementing a method for detecting security intrusions and soft faults in software systems using performance signatures, according to an embodiment of the invention. Referring now to FIG. 3, a computer system 301 for implementing an embodiment of the present invention can comprise, inter alia, a central processing unit (CPU) 302, a memory 303 and an input/output (I/O) interface 304. The computer system 301 is generally coupled through the I/O interface 304 to a display 305 and various input devices 306 such as a mouse and a keyboard. The support circuits can include circuits such as cache, power supplies, clock circuits, and a communication bus. The memory 303 can include random access memory (RAM), read only memory (ROM), disk drive, tape drive, etc., or a combinations thereof. The present invention can be implemented as a routine 307 that is stored in memory 303 and executed by the CPU 302 to process the signal from the signal source 308. As such, the computer system 301 is a general purpose computer system that becomes a specific purpose computer system when executing the routine 307 of the present invention.

The computer system 301 also includes an operating system and micro instruction code. The various processes and functions described herein can either be part of the micro instruction code or part of the application program (or combination thereof) which is executed via the operating system. In addition, various other peripheral devices can be connected to the computer platform such as an additional data storage device and a printing device.

It is to be further understood that, because some of the constituent system components and method steps depicted in the accompanying figures can be implemented in software, the actual connections between the systems components (or the process steps) may differ depending upon the manner in which the present invention is programmed. Given the teachings of the present invention provided herein, one of ordinary skill in the related art will be able to contemplate these and similar implementations or configurations of the present invention.

While the present invention has been described in detail with reference to exemplary embodiments, those skilled in the art will appreciate that various modifications and substitutions can be made thereto without departing from the spirit and scope of the invention as set forth in the appended claims.

What is claimed is:

1. A computer-implemented method for detecting security intrusions and soft faults in a software system, the method implemented by the computer comprising the steps of:
   receiving a performance signature sampled by a software system monitoring infrastructure;
   associating a plurality of buckets with each component of the performance signature;
   comparing a component of the sampled performance signature to an expected value for the performance signature component, wherein a bucket for the performance signature component is incremented if the sampled performance signature component exceeds the corresponding expected value, and the bucket for the performance signature component is decremented if the sampled performance signature component is less than the corresponding expected value;
   increasing a number of standard deviations from a mean value for the performance signature component if the bucket for the performance signature component overflows;
   reinitializing the current bucket to zero, if the bucket for the performance signature component is emptied; and
   executing a soft-fault or security categorization routine when said bucket for said performance signature component exceeds a threshold.

2. The method of claim 1, wherein said threshold comprises a first threshold and a second threshold, wherein said first threshold is less than said second threshold, wherein if said bucket for said performance signature component exceeds the first threshold, a security alert notification is executed, and if said bucket for said performance signature component exceeds said second threshold, a soft-fault notification is executed.

3. The method of claim 1, further comprising initializing the current bucket for the current component and the bucket index for the current component to zero, and initializing a maximum value of the current bucket for the current component to a predetermined maximum.

4. The method of claim 1, further comprising computing a depth of a next bucket for the current performance signature component, and reinitializing the current bucket to zero, when the bucket for the current performance signature component overflows.

5. The method of claim 4, wherein the depth of the next bucket for the current performance signature component is computed as $$D[N[i]+1, i] = \frac{D_{MAX}[i]}{S_N[i] - (\bar{x}[i] + N[i] \times \sigma[i])}.$$

6. The method of claim 4, wherein the depth of the next bucket for the current performance signature component is computed as $F_{[N,i]}(D_{MAX}[i])$, a function of the current bucket and the current component.

7. The method of claim 1, further comprising decreasing a number of standard deviations from a mean value for the performance signature component and reinitializing the current bucket and the maximum value of the current bucket for the current component to a predetermined maximum, when the bucket for the performance signature component is emptied and a value of the current bucket index is greater than zero.

8. The method of claim 1, wherein the performance signature is a multi-dimensional vector built from operating system metrics associated with the software system infrastructure.

9. A computer-implemented method for detecting security intrusions and soft faults in a software system, the method implemented by the computer comprising the steps of:
   receiving a performance signature sampled by a software system monitoring infrastructure, the performance signature being a multi-dimensional vector built from operating system metrics associated with the software system infrastructure;
   associating a plurality of buckets with each component of the performance signature;
   comparing a component of the sampled performance signature to an expected value for the performance signature component, wherein a bucket for the performance signature component is incremented if the sampled performance signature component exceeds the corresponding expected value, and the bucket for the performance signature component is decremented if the sampled performance signature component is less than the corresponding expected value;
   executing a security alert notification when said bucket for said performance signature component exceeds a first threshold; and
   executing a soft-fault notification when said bucket for said performance signature component exceeds a second threshold, wherein said first threshold is less than said second threshold.

10. The method of claim 9, wherein if the bucket for the current performance signature component overflows, the method further comprises:
    increasing a number of standard deviations from a mean value for the performance signature component;
    computing a depth of a next bucket for the current performance signature component based on the amount by which the sampled performance signature component exceeds the corresponding expected value; and
    reinitializing the current bucket to zero.

11. The method of claim 9, wherein if the bucket for the current performance signature component empties, and the bucket index for the current component is zero, the method further comprises reinitializing the current bucket to zero.

12. The method of claim 9, wherein if the bucket for the current performance signature component empties, and the bucket index for the current component is greater than zero, the method further comprises:
    decreasing a number of standard deviations from a mean value for the performance signature component; and
    reinitializing the current bucket and the maximum value of the current bucket for the current component to a predetermined maximum.

13. The method of claim 9, further comprising initializing the current bucket for the current component and the bucket index for the current component to zero, and initializing a maximum value of the current bucket for the current component to a predetermined maximum.

14. The method of claim 10, wherein the depth of the next bucket for the current performance signature component is computed as $$D[N[i]+1, i] = \frac{D_{MAX}[i]}{S_N[i] - (\bar{x}[i] + N[i] \times \sigma[i])}.$$

15. The method of claim 10, wherein the depth of the next bucket for the current performance signature component is computed as $F_{[N,i]}(D_{MAX}[i])$, a function of the current bucket and the current component.

16. A non-transitory program storage device readable by a computer, tangibly embodying a program of instructions executable by the computer to perform the method steps for detecting security intrusions and soft faults in a software system, the method comprising the steps of:
- receiving a performance signature sampled by a software system monitoring infrastructure, the performance signature being a multi-dimensional vector built from operating system metrics associated with the software system infrastructure;
- associating a plurality of buckets with each component of the performance signature;
- comparing a component of the sampled performance signature to an expected value for the performance signature component, wherein a bucket for the performance signature component is incremented if the sampled performance signature component exceeds the corresponding expected value, and the bucket for the performance signature component is decremented if the sampled performance signature component is less than the corresponding expected value;
- executing a security alert notification when said bucket for said performance signature component exceeds a first threshold; and
- executing a soft-fault notification when said bucket for said performance signature component exceeds a second threshold, wherein said first threshold is less than said second threshold.

17. The computer readable program storage device of claim 16, wherein if the bucket for the current performance signature component overflows, the method further comprises:
- increasing a number of standard deviations from a mean value for the performance signature component;
- computing a depth of a next bucket for the current performance signature component based on the amount by which the sampled performance signature component exceeds the corresponding expected value; and
- reinitializing the current bucket to zero.

18. The computer readable program storage device of claim 16, wherein if the bucket for the current performance signature component empties, and the bucket index for the current component is zero, the method further comprises reinitializing the current bucket to zero.

19. The computer readable program storage device of claim 16, wherein if the bucket for the current performance signature component empties, and the bucket index for the current component is greater than zero, the method further comprises:
- decreasing a number of standard deviations from a mean value for the performance signature component; and
- reinitializing the current bucket and the maximum value of the current bucket for the current component to a predetermined maximum.

20. The computer readable program storage device of claim 16, further comprising initializing the current bucket for the current component and the bucket index for the current component to zero, and initializing a maximum value of the current bucket for the current component to a predetermined maximum.

21. The computer readable program storage device of claim 17, wherein the depth of the next bucket for the current performance signature component is computed as $$D[N[i]+1, i] = \frac{D_{MAX}[i]}{S_N[i] - (\bar{x}[i] + N[i] \times \sigma[i])}.$$

22. The computer readable program storage device of claim 17, wherein the depth of the next bucket for the current performance signature component is computed as $F_{[N,i]}(D_{MAX}[i])$, a function of the current bucket and the current component.

* * * * *